United States Patent [19]

Sima, Jr. et al.

[11] 4,100,810
[45] Jul. 18, 1978

[54] LIGHT COUPLED READ-OUT SYSTEM FOR NOISE DOSIMETER

[75] Inventors: Gordon R. Sima, Jr., Joppa Township, Harford County; John L. Taylor, Jr., Baltimore, both of Md.

[73] Assignee: The Bendix Corporation, Southfield, Mich.

[21] Appl. No.: 803,172

[22] Filed: Jun. 3, 1977

[51] Int. Cl.² ............................................. G01H 3/12
[52] U.S. Cl. ...................................... 73/647; 361/171
[58] Field of Search ................ 73/647, 655; 179/1 N; 340/274 C; 361/171, 172

[56] References Cited

U.S. PATENT DOCUMENTS

| 3,772,650 | 11/1973 | Baskerville et al. | 361/171 |
| 3,884,086 | 5/1975 | Steger | 73/647 |
| 4,028,947 | 6/1977 | Cowen | 73/647 |

Primary Examiner—Richard C. Queisser
Assistant Examiner—Stephen A. Kreitman
Attorney, Agent, or Firm—W. G. Christoforo; Bruce L. Lamb

[57] ABSTRACT

A read-out system for a portable noise dosimeter uses light coupled signals to obtain a noise level read-out display. The light signals are coded to effectively prevent extraneous light signals from causing read-out.

6 Claims, 6 Drawing Figures

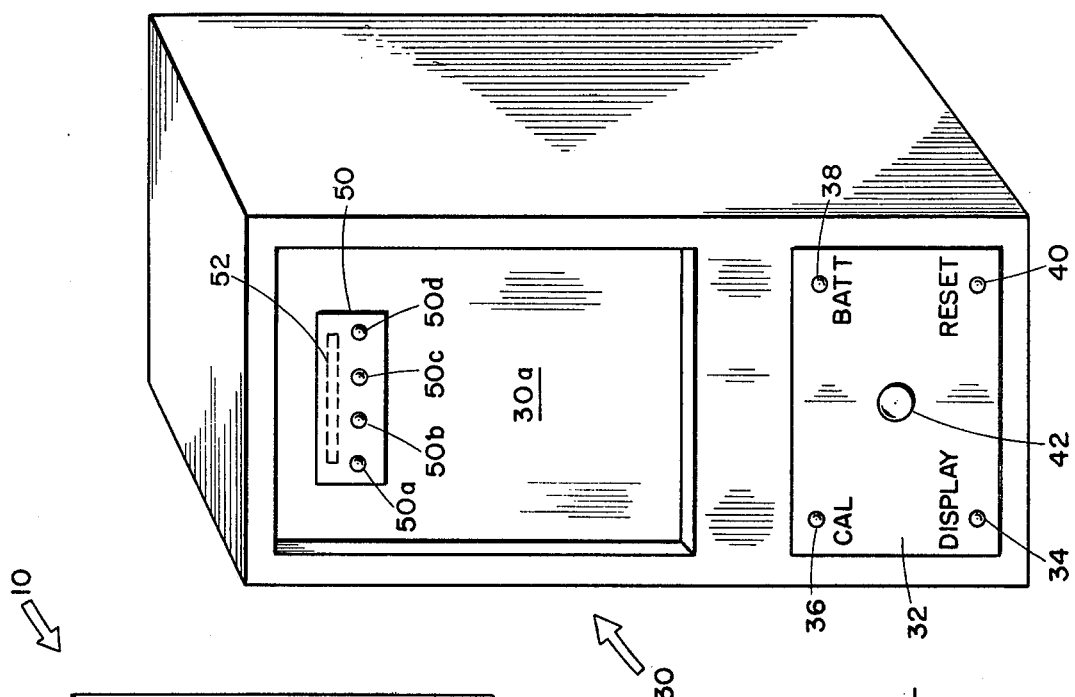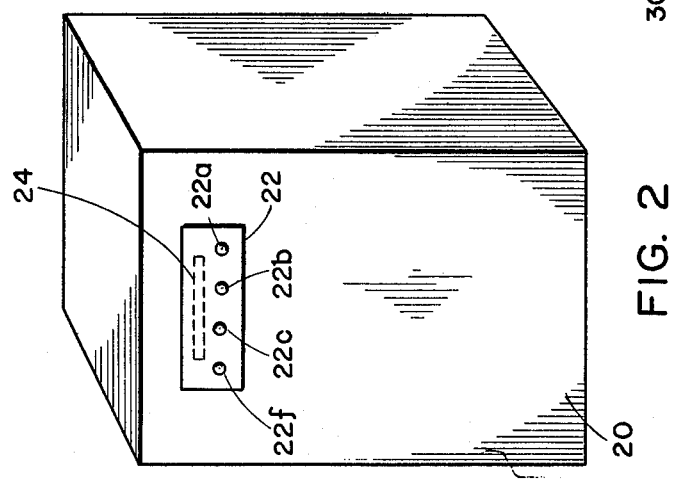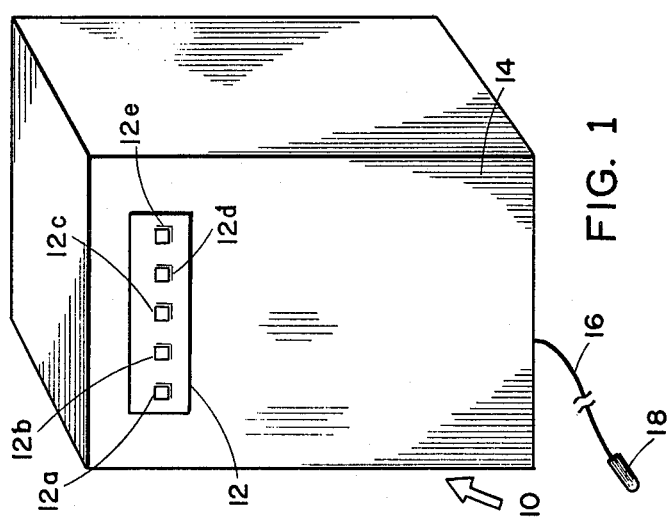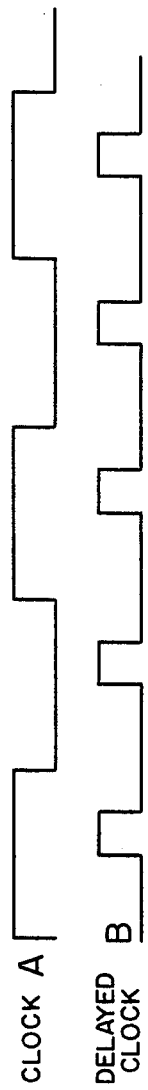

LIGHT COUPLED READ-OUT SYSTEM FOR NOISE DOSIMETER

BACKGROUND OF THE INVENTION

This invention relates to a noise exposure measuring device and more particularly to means for reading-out of such device a measure of noise exposure.

The measurement of environmental noise level has been a matter of great importance now that it is understood that persons exposed to moderately high environmental noise levels over an extended period of time or to very high environmental noise levels for relatively short periods of time may experience a temporary degradation in their current efficiency of operation or even long term degradation of their health. Light, small cumulative noise exposure meters have been developed which are readily portable and can be worn on a person's clothing. These noise exposure meters integrate noise level with respect to time and provide an indication of the cumulative noise to which the subject has been exposed. Specifically, a person, usually an industrial worker, habitually exposed to what could be dangerously high noise levels, wears such a noise exposure meter on his person with a noise input microphone connected thereto by an electrical cable and the microphone itself worn in the vicinity of one of the subject's ears. Then, as the subject goes about his normal work the noise exposure meter integrates the environmental noise level with respect to time. At the completion of the work day the difference in noise exposure meter reading from the beginning of the work day to the end of the work day is considered. A difference exceeding a predetermined threshold value indicates that the cumulative noise level to which the subject has been exposed was excessive and that corrective action to attenuate the noise effects upon the subject should be initiated.

Originally these noise exposure meters were self-contained in that the cumulative noise level was continuously displayed on the face of the instrument. This proved to be unsatisfactory since the subject spent unwarranted attention examining the reading from time to time. There have also been reported cases of sabotage of the meter either to raise or lower the reading thereof within reasonable limits wherein the sabotage would not be readily noticeable by a supervisor. Subsequent models of the noise level meter concealed the indication or, even more acceptably, required a base station into which the portable unit was attached for reading out the noise level indication through an electrical connector.

SUMMARY OF THE INVENTION

According to the present invention a personally carried noise exposure meter includes all the components and circuitry for accumulating in a memory a number related to cumulative noise. Additionally, a means for displaying the indication is also provided but is normally disconnected from the memory so that although a number is present in memory it is not displayed. In that sense the indication is normally concealed. Light responsive logic circuitry is provided to connect the memory to the display element whereby the memory contents can be read-out. The light responsive circuit receives a coded light interrogation signal from a base station into which the portable noise exposure meter is mated. A guard circuit is also provided which responds only to a properly coded light interrogation signal to prevent extraneous or other improper signals from actuating the read-out.

In a more universally useable embodiment of the invention the interrogation code can be varied to perform other functions on the noise exposure meter. For example, the noise exposure meter memory can be reset to an initial reference value, suitably zero, against which a future reading can be taken. The noise measuring and recording functions of the noise exposure meter can also be calibrated to ensure proper subsequent operation of the device. In the embodiment to be shown a means for testing a battery contained within the portable unit is also shown.

BRIEF DESCRIPTION OF THE DRAWINGS

FIG. 1 is a front view of a portable noise dosimeter.

FIG. 2 is a view of the back of a portable noise dosimeter.

FIG. 3 shows a base station used with the portable noise dosimeter of FIGS. 1 and 2.

FIG. 4 comprises waveforms of signals used to cause a display.

DESCRIPTION OF THE PREFERRED EMBODIMENT

Figure 5:
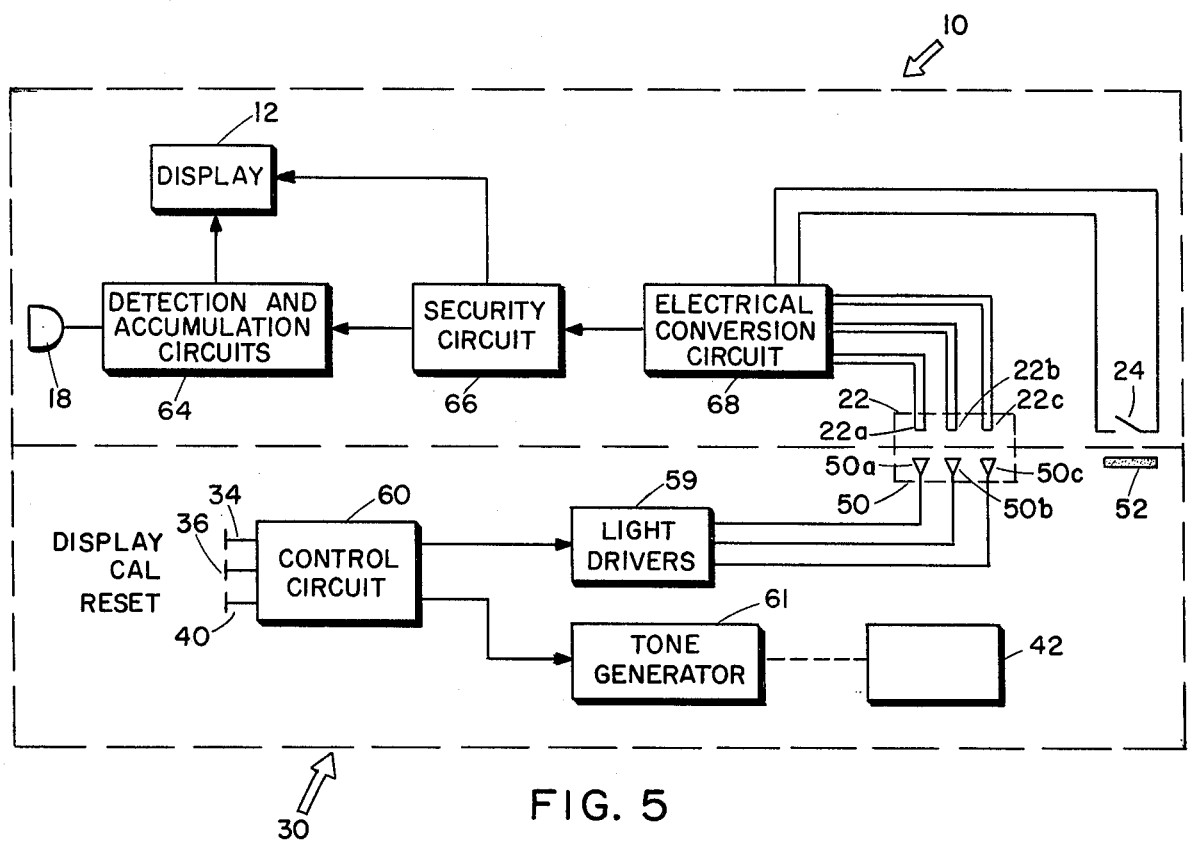
FIG. 5 is a block diagram of the portable noise dosimeter and base station.

For illustrative purposes the invention will be described with reference to the accompanying drawings wherein like numerals refer to like elements. Refer particularly to FIG. 1, which shows the external view of the front 14 of a portable cumulative noise dosimeter 10 which is relatively light and small, as known in the art, so that it can be conveniently worn on a person's clothing. The front surface is relatively clear of controls and other items except for a suitable numerical display such as a suitable standard LED or LCD display module 12 set therein whereon certain numbers are to be displayed as will become obvious as the description proceeds. In this embodiment display 12 includes single numeric displays 12a, 12b, 12c, 12d and 12e of the seven segment type whereon any of the decimal digits can be shown. Display 12 is suitably set behind a transparent screen for protected viewing.

A cable 16 connects a microphone 18 to unit 10. In use unit 10 is worn, for example, on the subject's belt or other suitable support, and microphone 18 is disposed by means not shown close to one of the subject's ears whereby the noise environment at the subject's ear can be monitored through the microphone.

Refer now to FIG. 2, a view of the back 20 of the portable cumulative noise dosimeter 10. Located in back 20 is an array 22 of three photosensitive receptors 22a, 22b and 22c and a single LED which is used for battery test, each of which is suitably protected behind a sheet of light transparent material such as plexiglas. As will be explained below, the photoreceptors respond to coded light signals from a base station, also to be described, to read-out the dosimeter 10 and allow other functions to be performed thereon. Located also in array 22 is a magnetically actuated reed switch 24 which, as will be explained, cooperates with a magnet on the base station to insure intimate mating of the dosimeter 10 and the base station before effective light communication between the two units can be made.

Refer to FIG. 3 which shows a typical base station 30 which includes a control panel 32 having various control buttons, i.e., Display 34, Cal 36 (Calibrate), Bat 38 (Battery Test) and Reset 40. Control panel 32 also includes a central receptacle 42 from which a known level and frequency acoustic tone is generated when Display button 34 and Cal button 36 are depressed simultaneously. If at the same time a dosimeter 10 is properly mated into base station 30 and microphone 18 is inserted into receptacle 42 the dosimeter can be calculated.

Base station 30 includes a light source array 50 having four (in this embodiment) light emitting diodes 50a, 50b, 50c and 50d. Array 50 also includes a magnet 52 and is arranged with respect to a recess 30a in base station 30 into which the dosimeter of FIG. 1 mates so that array 50 underlies array 22 of FIG. 2 with, specifically, LED 50a underlying photoreceptor 22a, LED 50b underlying photoreceptor 22b and LED 50c underlying photoreceptor 22c. In addition, when mated, magnet 52 will underlie magnetic switch 24. Thus, as should now be clear, light signals generated by one of the LED's 50a, 50b or 50c will be received, when the units are properly mated, only by the specific overlying photoreceptor. Since when properly mated magnet 52 is then effective to cause switch 24 to close, the light signals generated by base station 30 during that time will be effectively received by the mated dosimeter.

Assuming a dosimeter is properly mated to base station 30, depression of display button 34 will cause the previously mentioned dosimeter memory to be read-out onto display 12. Simultaneous depression of buttons 34 and 36 with microphone 18 inserted into receptacle 42 will cause a reading to appear on display 12. This reading, if the dosimeter is properly calibrated, will be of a predetermined number. A recessed adjustment (not shown) is provided in dosimeter 10 for calibration purposes if the dosimeter is found to be out of calibration. Simultaneous depression of buttons 34 and 40 will reset the dosimeter memory to some predetermined initial value, suitably zero. Simultaneous depression of buttons 34 and 38 will cause LED 50d to illuminate if a battery within base station 30 is in properly charged condition. Of course, during battery charge test the base station circuits are arranged to cause LED 50d to illuminate, assuming a charged battery, whether a dosimeter is mated therein or not.

Refer now to FIG. 5 which is a block diagram of the noise dosimeter and base station circuits where dashed box 10 includes the dosimeter and dashed box 30 includes the base station circuits. In this figure the battery test functions are not shown for simplicity. The base station here includes control buttons 34, 36 and 40 which supply manually actuated signals to a control and coding circuit 60 which, in turn, controls light driver circuit 59 which supplies coded power to light sources (LED's) 50a, 50b and 50c. Control circuit 60 is simply a timing circuit which is comprised of circuits to generate the light code signals from LED's 50a and 50b shown at lines A and B of FIG. 4, reference to which should now be made and where the pulses indicate an illuminated LED and the interpulse period indicates the LED is extinguished. Specifically, when display control 34 is alone depressed the circuits operate to cause LED 50a to generate the square wave signal of line A and LED 50b to generate the delayed pulse waveform of line B. As will be realized by one skilled in the art, control circuits 60, in order to produce the signals of lines A and B, need merely be a frequency source clocked down in a cascade of flip-flops to provide the signal of line A with one output of a flip-flop gated out to produce the signal of line B.

Depressing controls 34 and 40 or 34 and 36 simultaneously causes the light signals above described to be generated and in addition causes LED 50c to be continuously illuminated so long as the controls are depressed. Depressing controls 34 and 36 simultaneously causes, in addition to the light signals immediately above described, a tone of predetermined frequency and noise level to be generated by tone generator 61 which is acoustically coupled to receptacle 42, which is also seen in FIG. 3. More need not be said about the base station circuits except to note the presence of magnet 52.

Dosimeter 10 includes microphone 18, display 12, magnetically actuated switch 24 and light receptors 22 previously described. Light signals received by receptors 22 are converted into electrical signals by an electrical conversion circuit 68. A security circuit 66 prevents extraneous light signals from causing the dosimeter memory included in the detection and accumulation circuits from being read-out or otherwise being interfered with in the absence of valid light signals. One security means already discussed is magnetically actuated switch 24. Other security means will be discussed below.

As mentioned, the dosimeter memory is contained in circuits 64 together with the other noise dosimeter circuits of the type known to those skilled in the art.

Figure 6:
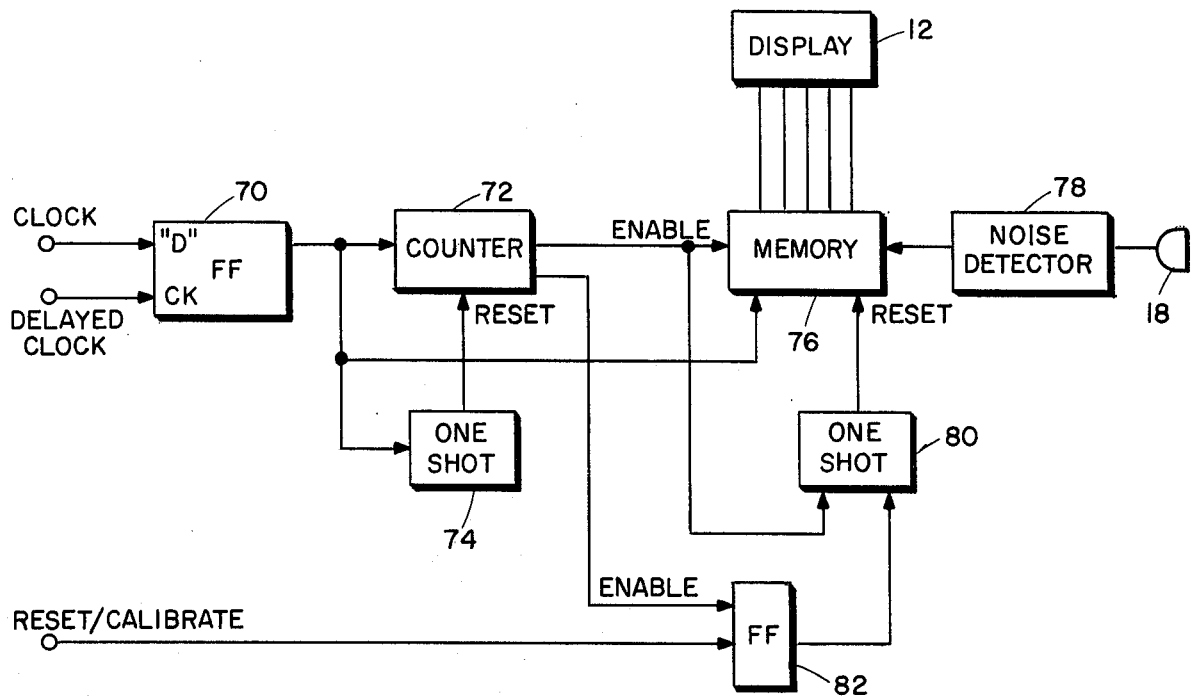
FIG. 6 is a block diagram showing portions of the portable noise dosimeter in greater detail.

Refer now to FIG. 6 which shows the applicable portions of circuits 64 and 66 together with display 12. The prior art noise detector 78, to which microphone 18 is connected, is shown supplying a noise level to memory 76 which can subsequently be read-out in display 12 in response to the means of the invention. It is here assumed that the light signals discussed with respect to FIG. 5 have been converted to electrical signals by the electrical conversion circuit 68 of FIG. 5. These signals comprise the clock and delayed clock (lines A and B, respectively, of FIG. 4) which are applied respectively to the "D" and clock input terminals of "D" type flip-flop 70. Clocks and delayed clocks arriving in proper phase relationship toggle flip-flop 70, the output of which comprises a "scan clock" signal, which latter signal is applied to counter 72, one-shot 74 and memory 76. The scan clocks applied to memory 76 are generally effective to cause that memory to read-out its contents to display 12. However, the scan clocks become effective only in response to an enable signal from counter 72 which is arranged to generate the enable signal after some predetermined consecutive number of scan clocks, in this embodiment, five consecutive scan clocks, have been received.

One-shot 74 is retriggered with each scan clock and provides a pulse output whose period is somewhat longer than the period between scan clocks. The trailing edge of the one-shot output pulse is used to reset counter 72. Thus, considering the effect of counter 72 and one-shot 74, there must be five consecutive scan clocks before memory 76 can be read-out and thereafter the scan clocks must continue without interruption to continue the read-out.

Read-out of memory 76 proceeds one digit of display 12 at a time in response to the effective scan clocks in the manner known to those skilled in the art. Of course, scan clocks preferably occur at a sufficiently high rate to provide a flicker-free display.

Reset is provided by the reset signal from circuit 68 (and light receptor 22C) of FIG. 5 and is effective only when simultaneously the enable signal from counter 72 is generated as follows. The enable signal from counter 72 causes memory 76 to be receptive to reset signals from one-shot 80 whose signal is generated in response to the aforementioned reset signal from circuit 68 of FIG. 5 which proceeds through flip-flop 82 and in response to the enable signal from counter 72.

In the calibrate mode the calibrate signal not only energizes standard tone generator 61 (FIG. 5) but also enters through flip-flop 82 to energize one-shot 80 to reset memory 76. Thus, the memory having been reset the standard tone in microphone 18 provides a calibration indication, assuming microphone 18 is inserted into receptacle 42 of FIG. 5.

Having described this embodiment of the invention certain modifications and alterations thereof should now suggest themselves to those skilled in the art. Accordingly, the invention is to be limited to the true spirit and scope of the appended claims.

The invention claimed is:

1. In an audio dosimeter wherein a memory contains an indication which is a measure of noise dose and a display device on which said indication is shown, means for showing the memorized indication on said display device comprising a base station for generating a sequence of light encoded signals to said dosimeter and light signal decoding circuits in said dosimeter responsive to said light encoded signals for showing said indication on said display.

2. The audio dosimeter of claim 1 including additionally a magnet on one of said base station and dosimeter and a magnetically actuated switch on the other of said base station and dosimeter for interrupting the response of said dosimeter to light signals until the dosimeter is in a predetermined physical relationship with said base station.

3. The audio dosimeter of claim 2 wherein said coded light signals comprise a first predetermined train of light pulses and a related second predetermined train of light pulses.

4. The audio dosimeter of claim 2 wherein said base station includes an array of light emitting diodes for radiating said coded light signals and said dosimeter includes an array of light receptors for receiving said coded light signals.

5. The audio dosimeter of claim 4 including a tone generator operable to produce a tone of predetermined noise level and frequency for calibrating said dosimeter.

6. The audio dosimeter of claim 1 including proximity means comprising at least two parts, said base station including one said part and said dosimeter including another said part, wherein said parts cooperate with one another to interrupt the response of said dosimeter to light signals until the dosimeter is in a predetermined physical relationship with said base station.

* * * * *